United States Patent [19]
Nagata et al.

[11] Patent Number: 5,652,058
[45] Date of Patent: Jul. 29, 1997

[54] CARBON FIBER ROVINGS FOR REINFORCEMENT OF CONCRETE

[75] Inventors: Yoshikazu Nagata; Katsumi Takano, both of Ibaraki-ken; Sadatoshi Ohno; Toshio Yonezawa, both of Chiba-ken; Junichi Ida; Masaki Iwata, both of Nagoya, all of Japan

[73] Assignees: Petoca, Ltd., Tokyo; Takenaka Corporation, Osaka, both of Japan

[21] Appl. No.: 371,483

[22] Filed: Jan. 11, 1995

Related U.S. Application Data

[63] Continuation of Ser. No. 156,699, Nov. 24, 1993, abandoned.

[30] Foreign Application Priority Data

Nov. 27, 1992 [JP] Japan .................. 4-318305

[51] Int. Cl.$^6$ .......................................... D02G 3/00
[52] U.S. Cl. .................. 428/378; 428/364; 428/368; 428/408; 106/638; 106/713; 423/447.1; 423/447.2; 423/445 R
[58] Field of Search ............... 428/364, 368, 428/378, 408; 52/309.17, 664; 423/447.1, 447.4, 447.2, 447.8, 448, 445 R; 585/422, 425, 11; 554/1, 223; 568/852, 853; 264/107, 109, 110, 137, 292; 106/638, 713

[56] References Cited

U.S. PATENT DOCUMENTS

| | | | |
|---|---|---|---|
| 3,994,762 | 11/1976 | Wrzesier et al. ............. 156/148 |
| 4,293,533 | 10/1981 | Asamo et al. . | |
| 4,301,135 | 11/1981 | Nazem et al. ............. 423/447.4 |
| 4,303,631 | 12/1981 | Lewis et al. ............. 423/447.1 |
| 4,317,809 | 3/1982 | Lewis et al. ............. 423/447.1 |
| 4,431,513 | 2/1984 | Lewis ............. 208/447.1 |
| 4,457,828 | 7/1984 | Lewis ............. 585/11 |
| 4,568,581 | 2/1986 | Poeples, Jr. ............. 428/35 |
| 4,571,317 | 2/1986 | Layden, Jr. et al. ............. 264/29.1 |
| 4,613,673 | 9/1986 | Layden et al. ............. 264/103 |
| 4,648,224 | 3/1987 | Kitta et al. ............. 52/223 R |
| 4,687,614 | 8/1987 | Suzuki et al. ............. 264/40.1 |
| 4,706,430 | 11/1987 | Sugita et al. ............. 52/309.16 |
| 4,741,873 | 5/1988 | Fischer et al. ............. 264/25 |
| 4,751,258 | 6/1988 | Minami . | |
| 4,770,832 | 9/1988 | Okamoto et al. ............. 264/103 |
| 4,923,648 | 5/1990 | Hara et al. ............. 264/29.2 |
| 5,277,973 | 1/1994 | Yamamura et al. ............. 428/367 |

FOREIGN PATENT DOCUMENTS 2 259 789   8/1975   France .

*Primary Examiner*—Merrick Dixon
*Attorney, Agent, or Firm*—Oblon, Spivak, McClelland, Maier & Neustadt, P.C.

[57] ABSTRACT

Carbon fiber rovings for reinforcement of concrete are here disclosed which are obtained by sizing, with a sizing agent, strands each consisting of 100 to 1,000 monofilaments of mesophase pitch-based carbon fibers, and then bundling the thus sized 5 to 100 strands into one roving.

6 Claims, No Drawings

CARBON FIBER ROVINGS FOR REINFORCEMENT OF CONCRETE

This application is a continuation of application Ser. No. 08/156,699, filed on Nov. 24, 1993, now abandoned.

BACKGROUND OF THE INVENTION (i) Field of the Invention

The present invention relates to carbon fibers for reinforcement of concrete, and more specifically, it relates to mesophase pitch-based carbon fibers for reinforcement of concrete which have excellent adhesive properties to cement, good process passage properties through a direct spray gun and good bundling properties and which are particularly suitable for a direct spray method.

(ii) Description of the Prior Art

In recent years, carbon fibers have been used not only as materials in various fields of, for example, airplane parts, automobile parts, sporting goods and the like, but also as reinforcement materials for resins and cements, because of having excellent features such as high strength, high modulus of elasticity and light weight. Thus, the demand of the carbon fibers has been remarkably increased.

The carbon fibers can be roughly classified into polyacrylonitrile-based (PAN-based) carbon fibers and pitch-based carbon fibers. The former PAN-based carbon fibers are high-performance (HP) carbon fibers which can be obtained from a polyacrylonitrile as a raw material, and they usually have high strength and moderate modulus of elasticity. However, the PAN-based carbon fibers have some drawbacks. That is, acrylonitrile fibers which are raw materials are expensive, and the yield of the carbon fibers from these fibers is extremely low, 45% or less. Furthermore, since these acrylonitrile fibers are produced by a wet spinning method, intricate steps are required to manufacture strands consisting of a small number of filaments, which unavoidably increases manufacturing costs.

On the other hand, the pitch-based carbon fibers can be obtained from a raw material such as a petroleum pitch or a coal tar pitch, and the pitch-based carbon fibers have some merits. That is, the pitch which is the raw material is inexpensive and abundantly available, and the yield of the carbon fibers is high.

In order to improve physical properties, various researches have been conducted, and nowadays, it has been successfully attained to obtain high-performance (HP) carbon fibers having high strength and high modulus of elasticity from a mesophase (liquid crystals) pitch containing an optically anisotropic phase, a neomesophase pitch, a pre-mesophase pitch or a latent anisotropic pitch. In this connection, when an optically isotropic pitch is used, general-purpose (GP) carbon fibers having low strength and low modulus of elasticity can be only obtained.

In the meantime, kneaded materials of hydraulic cement powders have been widely used as various building materials and civil engineering materials. In order to reinforce such a kneaded material and to prevent the occurrence of cracks, it has been heretofore attempted to blend a fibrous material with the kneaded material. However, the employment of asbestos as the reinforcement fibers is not preferable, because the asbestos is a carcinogen. In addition, glass fibers are poor in alkali resistance, so that the strength of the glass fibers themselves inconveniently deteriorates in the cement. Thus, various kinds of organic fibers and alkali-resistant glass fibers are instead used as the reinforcement materials. However, the organic fibers are poor in fire resistance, and even in the case of the alkali-resistant glass fibers, the strength of the kneaded material declines, when these fibers are used for a long period of time under alkaline circumstances of the cement or the like. Hence, much attention is now paid to carbon fibers having excellent heat resistance and excellent chemical resistance as well as high strength and high modulus of elasticity.

However, when added to and mixed with the cement, the carbon fibers are poorer in adhesive properties (or stickiness) to the cement as compared with the asbestos and the glass fibers, and therefore there is the problem that they cannot exert a sufficient effect as the reinforcement material. Accordingly, various contrivances have been made in order to increase the adhesive properties of the carbon fibers to the cement and to thereby heighten the strength of the resultant carbon fibers-reinforced cement material. For example, there have been suggested a method in which carbon fiber strands impregnated with a hydrophobic liquid resin such as an epoxy resin are stretched in cement, and the resin and the cement are then simultaneously hardened (Japanese Patent Publication No. 19620/1983), a method in which carbon fibers mutually bound by a water-soluble binder such as methyl cellulose are arranged in one direction or two cross-able directions in cement (Japanese Patent Application Laid-open No. 129657/1981), a method in which cement slurry layers are superposed upon each other with the interposition of a carbon fiber sheet including a water-soluble synthetic resin emulsion such as an acrylic emulsion (Japanese Patent Application Laid-open No. 223659/1983), a method in which in manufacturing a reinforced cement material by a hacek manufacturing method, a nonionic or a cationic high polymeric coagulant such as a polyalkylamino acrylate is applied onto the surfaces of fibers (Japanese Patent Application Laid-open No. 81052/1985), and a fibrous material for cement reinforcement in which a cationic rubber latex is applied onto the surfaces of carbon fibers (Japanese Patent Application Laid-open No. 108755/1987).

In these conventional techniques, however, restriction is put on the morphology of the carbon fibers to be used and a construction method to be selected, and the kind of cement to be used is limited. In addition, they have the problem that the adhesive properties to cement are not sufficient. For these reasons, the conventional techniques are not always sufficiently satisfactory.

In recent years, in the manufacture of a concrete composite material containing a certain kind of fibers as a reinforcement material, a direct spray method in which longer fibers (25 to 30 mm or more) can be used and which can sufficiently exert dynamic characteristics has been noticed and put to practical use. In the case that this direct spray method is applied, it is important that the carbon fibers for reinforcement are excellent in adhesive properties to cement, and that they have good process passage properties through a direct spray gun, i.e., friction between the carbon fibers and metals is so low as to make the carbon fibers easily slidable.

SUMMARY OF THE INVENTION

In view of the above-mentioned situations, the present invention has been achieved, and an object of the present invention is to provide mesophase pitch-based carbon fibers for reinforcement of concrete which have excellent adhesive properties to cement, good process passage properties through a direct spray gun and good bundling properties and which are suitable for a direct spray method.

The present inventors have intensively conducted researches with the intention of developing mesophase pitch-based carbon fibers for reinforcement of concrete which have the above-mentioned preferable properties, and as a result, they have found that this purpose can be achieved by carbon fiber rovings which consist of a specific number of strands each consisting of a specific number of monofilaments of mesophase pitch-based carbon fibers, said strand being sized with a sizing agent. The present invention has been attained on the basis of such a knowledge.

That is, the present invention is directed to carbon fiber rovings for reinforcement of concrete which are obtained by sizing, with a sizing agent, strands each consisting of 100 to 1,000 monofilaments of mesophase pitch-based carbon fibers, and then bundling the thus sized 5 to 100 strands into one roving.

DETAILED DESCRIPTION OF THE INVENTION

In the present invention, a pitch (a pitch for spinning) which can be used as a raw material for mesophase pitch-based carbon fibers may be a pitch from petroleum or coal, and examples of the usable pitch include a mesophase pitch containing an optically anisotropic phase, a neomesophase pitch, a premesophase pitch and a latent anisotropic pitch.

No particular restriction is put on the kind of petroleum-based and coal-based raw material pitches, and for example, the usable raw material pitch can be prepared by subjecting a petroleum-based pitch (a heavy oil) such as a crude oil distillation residual oil, a fluid catalytic cracking (FCC) heavy oil, a naphtha cracking residual oil or an ethylene bottom oil, or a coal-based pitch (a heavy oil) such as a coal tar or a coal-liquefied oil to treatment steps of filtration, distillation, hydrogenation, catalytic cracking and the like.

The mesophase pitch-based carbon fibers which can be used in the present invention can be prepared in accordance with a known method such as a melting method, i.e., by spinning the pitch for spinning into pitch fibers having a fiber diameter of about 5 to 20 μm, making the fibers infusible at a temperature of 200° to 400° C. or so under a gas atmosphere of oxygen, an oxygen-rich gas, air or the like, carbonizing the fiber at a temperature of 1,000° C. or more under an inert gas atmosphere such as nitrogen or argon, and then, if necessary, graphitizing the same. If necessary, prior to the carbonization treatment, a preliminary carbonization treatment may be carried out at a temperature in the range of 350° to 800° C. under an inert gas atmosphere of nitrogen, argon or the like.

The thus obtained mesophase pitch-based carbon fibers suitably have a tensile strength of 150 kgf/mm$^2$ or more and a modulus in tension of $10 \times 10^3$ kgf/mm$^2$ or more from the viewpoints of the physical properties of a cement composite and the application of a direct spray method.

In the present invention, it is necessary to size strands each consisting of 100 to 500 monofilaments of the above-mentioned mesophase pitch-based carbon fibers with a sizing agent. As the sizing agent, ester oils, polyethylene glycols and polyether esters are desirable, because they can provide the carbon fibers for reinforcement of concrete which are excellent in adhesive properties to cement, process passage properties through a direct spray gun and bundling properties.

Preferable examples of the ester oil-based sizing agent include esters of oleic acid and aliphatic monovalent alcohols such as oleyl oleate, stearyl oleate, lauryl oleate, octyl oleate, 2-ethylhexyl oleate and isotridecyl oleate; and esters of oleyl alcohol and monovalent fatty acids such as oleyl stearate, oleyl palmitate, oleyl laurate, oleyl isostearate and oleyl octanoate.

Preferable examples of the polyethylene glycol-based sizing agents include polyoxyalkylene bisphenol ethers. Typical examples of these polyoxyalkylene bisphenol ethers include ethers represented by the formula

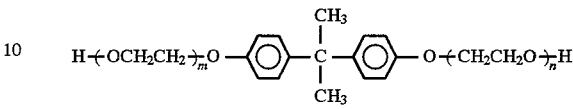

wherein each of m and n is an integer of 1 to 29, and m+n=30.

On the other hand, a preferable example of the polyether ester-based sizing agents can be obtained by polycondensation reaction of a dicarboxylic acid component and a glycol component in the presence of a catalyst. A typical example of this polyether ester is what is formed by the polycondensation reaction of dimethyl terephthalate, ethylene glycol adipate and ethylene glycol.

These sizing agents may be used singly or in combination of two or more thereof.

No particular restriction is put on the application technique of the above-mentioned sizing agents. First, the sizing agents are dissolved in a suitable solvent or emulsified in an aqueous medium to prepare a solution or an emulsion, and strands each cosisting of 100 to 1,000 monofilaments of the carbon fibers are then brought into contact with or immersed in the thus prepared solution or emulsion. Afterward, the solvent is removed by a conventional known means such as hot-air drying, infrared drying or microwave drying to cover the surfaces of the carbon fibers with the sizing agent. If the number of the monofilaments per strand is less than 100, the manufacturing cost of the carbon fibers noticeably increases, and if it is more than 1,000, the manufacture is difficult and the impregnation properties of a cement matrix are poor, so that a reinforcement effect deteriorates unpreferably. Considering the easiness of the manufacture, the number of the monofilaments per strand is preferably 500 or less. The amount of the sizing agent to be applied is suitably in the range of 0.5 to 10% by weight based on the weight of the carbon fibers. If this amount is less than 0.5% by weight, the effect of the present invention cannot be sufficiently exerted, and if it is more than 10% by weight, bundling is excessively strengthened, so that a dispersion degree of the carbon fibers in cement is low and the physical properties of a concrete composite tend to decline.

In the present invention, 5 to 100 of the thus sized strands are wound into one roving to obtain the desired carbon fiber rovings for reinforcement of concrete. If the number of the strands in one roving is less than 5, the productivity of the cement composite is low, which leads to the increase of the cost. If it is more than 100, the passage properties of the fibers through a spray gun in a direct spray method deteriorate unpreferably.

The thus obtained mesophase pitch-based carbon fibers for reinforcement of concrete have excellent adhesive properties to cement and less friction to metals, and hence they are easily slidable, so that the process passage properties of the carbon fibers through the direct spray gun are good. In addition, they are excellent in bundling properties. Consequently, the carbon fibers are suitable for the direct spray method.

In molding a concrete composite containing the carbon fibers for reinforcement of concrete, the direct spray method is preferably used. This direct spray method comprises spraying the carbon fibers through a nozzle of a compressed air gun, while the rovings of the carbon fibers are continuously cut, and simultaneously spraying a cement slurry through another nozzle for molding.

No particular restriction is put on the cement slurry which can be used in this process, and there can be employed any cement slurry which has been heretofore used in the manufacture of the conventional carbon fibers-reinforced concrete composite. An example of the cement slurry is a mixed slurry formed by blending a hydraulic cement such as portland cement, blast furnace cement or aluminous cement with an aggregate such as sand, siliceous sand, perlite, vermiculite, sirasu balloon, fly ash or microfine silica and admixtures such as a dispersant, a water reducing agent, an inflating agent and an anti-foaming agent; adding water thereto; and then mixing them.

Blending ratios such as a water/cement ratio and an aggregate/cement ratio in the slurry are suitably selected in compliance with the morphology of the carbon fibers to be used, and the moldability and the construction properties of the concrete composite to be manufactured. Afterward, the thus obtained unhardened molded article can be cured and set by a process such as water-curing, gas-curing, vapor-curing or high-temperature high-pressure curing to manufacture a carbon fibers-reinforced concrete composite.

The thus obtained concrete composite has a high bending strength of 300 kgf/cm$^2$ or more, and hence it can be suitably used in various applications in building and civil engineering fields.

Next, the present invention will be described in more detail in reference to examples.

EXAMPLE 1

An aqueous emulsion solution containing stearyl oleate at a concentration of 4% by weight was prepared, and strands each consisting of 250 monofilaments of mesophase pitch-based carbon fibers having a modulus in tension of $21 \times 10^3$ kgf/mm$^2$ and a tensile strength of 216 kgf/mm$^2$ were immersed in the above-mentioned solution, followed by drying, to size the strands. Afterward, 30 of these strands were bundled to prepare a roving of the carbon fibers for reinforcement of concrete to which the sizing agent was applied in an amount of 1.0% by weight.

On the other hand, a cement mortar was prepared which had a cement/sand weight ratio of 1.33, a water/cement weight ratio of 0.35 and a cement admixture/cement weight ratio of 0.008.

By the use of a spray gun for a direct spray method, the carbon fibers for reinforcement of concrete were sprayed, while the rovings of the carbon fibers were continuously cut into a length of 25 mm, and simultaneously the cement mortar was also sprayed to obtain a molded article of the carbon fibers-reinforced cement concrete. In this case, the feed of the carbon fibers was adjusted so as to be 3% by volume.

This molded article was cut into specimens for a bending test having a length of 250 mm, a width of 50 mm and a thickness of 10 mm at an age of seven days at room temperature, and a three-point bending test was made, a distance between supports being 200 mm. As a result, the bending strength was 345 kgf/cm$^2$. In addition, the same molded article was subjected to the same test at an age of 28 days at room temperature, and as a result, the bending strength was 365 kgf/cm$^2$.

EXAMPLE 2

An aqueous emulsion solution containing an adduct of ethylene oxide with bisphenol A having a molecular weight of 1,500 at a concentration of 4% by weight was prepared, and strands each consisting of 150 monofilaments of mesophase pitch-based carbon fibers having a modulus in tension of $21 \times 10^3$ kgf/mm$^2$ and a tensile strength of 216 kgf/mm$^2$ were immersed in the above-mentioned solution, followed by drying, to size the strands. Afterward, 30 of these strands were bundled to prepare a roving of the carbon fibers for reinforcement of concrete to which the sizing agent was applied in an amount of 1.0% by weight.

On the other hand, a cement mortar was prepared which had a cement/sand weight ratio of 1.33, a water/cement weight ratio of 0.35 and a cement admixture/cement weight ratio of 0.008. Subsequently, the same procedure as in Example 1 was carried out.

As a result, the bending strength of a specimen at an age of 7 days at room temperature was 325 kgf/cm$^2$.

EXAMPLE 3

Polycondensation reaction was carried out between excess ethylene glycol and dimethyl terephthalate (molar ratio=0.20), ethylene glycol adipate (molar ratio=0.78), 5-sulfonsodiumisophthaldimethyl (molar ratio=0.02) and polyethylene glycol (molar ratio=0.15) in the presence of a catalyst to obtain a polyether ester having a molecular weight of 8,000 to 12,000. Afterward, an aqueous emulsion solution containing this polyether ester at a concentration of 2% by weight was prepared, and strands each consisting of 150 monofilaments of mesophase pitch-based carbon fibers having a modulus in tension of $21 \times 10^3$ kgf/mm$^2$ and a tensile strength of 216 kgf/mm$^2$ were immersed in the above-mentioned solution, followed by drying, to size the strands. Afterward, 30 of these strands were bundled to prepare a roving of the carbon fibers for reinforcement of concrete to which the sizing agent was applied in an amount of 1.0% by weight.

On the other hand, a cement mortar was prepared which had a cement/sand weight ratio of 1.33, a water/cement weight ratio of 0.35 and a cement admixture/cement weight ratio of 0,008. Subsequently, the same procedure as in Example 1 was carried out.

As a result, the bending strength of a specimen at an age of 7 days at room temperature was 315 kgf/cm$^2$, and that of a specimen at an age of 28 days at room temperature was 330 kgf/cm$^2$.

Mesophase pitch-based carbon fibers for concrete reinforcement of the present invention are excellent in adhesive properties to cement, process passage properties through a direct spray gun, and bundling properties. Hence, these carbon fibers are suitable for a direct spray method.

In addition, a concrete composite containing the carbon fibers for concrete reinforcement has high bending strength and can be suitably used in various applications in building and civil engineering fields.

What is claimed is:

1. Concrete reinforced with carbon fibers, which is produced by molding cement mortar and carbon fiber rovings, which rovings consist of 5 to 100 strands each consisting of 100 to 1,000 monofilaments of mesophase pitch-based carbon fibers, each of said strands being sized with a sizing agent which is selected from the group consisting of ester oils, polyethylene glycols and polyether esters.

2. The concrete reinforced with carbon fibers according to claim 1, wherein the amount of said sizing agent to be applied to each of said strands is in the range of 0.5 to 10% by weight based on the weight of said carbon fibers.

3. The concrete reinforced with carbon fibers according to claim 1, wherein said mesophase pitch-based carbon fibers have a tensile strength of 150 kgf/mm$^2$ or more and a modulus in tension of $10 \times 10^3$ kgf/mm$^2$ or more.

4. Concrete reinforced with carbon fibers, which is produced by molding by a direct spray method, cement mortar and carbon fiber rovings, which rovings consist of 5 to 100 strands each consisting of 100 to 1,000 monofilaments of mesophase pitch-based carbon fibers each of said strands being sized with a sizing agent selected from the group consisting of ester oils, polyethylene glycols and polyether esters.

5. The concrete reinforced with carbon fibers according to claim 4, wherein the amount of said sizing agent to be applied to each of said strands is in the range of 0.5 to 10% by weight based on the weight of said carbon fibers.

6. The concrete reinforced with carbon fibers according to claim 4, wherein said mesophase pitch-based carbon fibers have a tensile strength of 150 kgf/mm$^2$ or more and a modulus in tension of $10 \times 10^3$ kgf/mm$^2$ or more.

* * * * *